US009864469B2

(12) United States Patent
Cho et al.

(10) Patent No.: US 9,864,469 B2
(45) Date of Patent: Jan. 9, 2018

(54) DISPLAY APPARATUS FOR A VEHICLE

(71) Applicant: LG ELECTRONICS INC., Seoul (KR)

(72) Inventors: Youngjun Cho, Seoul (KR); Munchae Joung, Seoul (KR); Sunuk Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 44 days.

(21) Appl. No.: 14/692,989

(22) Filed: Apr. 22, 2015

(65) Prior Publication Data
US 2015/0301688 A1 Oct. 22, 2015

(30) Foreign Application Priority Data
Apr. 22, 2014 (KR) .................. 10-2014-0048217

(51) Int. Cl.
*G06F 3/047* (2006.01)
*G06F 3/041* (2006.01)
(Continued)

(52) U.S. Cl.
CPC ............ *G06F 3/0421* (2013.01); *B60K 37/00* (2013.01); *G06F 3/0304* (2013.01); *G06F 3/042* (2013.01);
(Continued)

(58) Field of Classification Search
CPC ................................ G06F 3/041; B60K 35/00
See application file for complete search history.

(56) References Cited

U.S. PATENT DOCUMENTS

2008/0278450 A1   11/2008   Lashina
2009/0058829 A1*  3/2009    Kim .................... G06F 3/016
                                                      345/173
(Continued)

FOREIGN PATENT DOCUMENTS

CN   101285952   10/2008
CN   201440255 U  4/2010
(Continued)

OTHER PUBLICATIONS

Extended European Search Report issued in European Application No. 15001174.0 dated Oct. 30, 2015, 19 pages.
(Continued)

*Primary Examiner* — Lin Li
(74) *Attorney, Agent, or Firm* — Fish & Richardson P.C.

(57) ABSTRACT

A vehicle includes a display apparatus. The display apparatus includes a display unit, an optical sensor unit, a touch sensor unit, and a processor. The processor can determine whether a hand is located within a first distance range away from the display unit and whether the hand is located within a second distance range away from the display unit that is closer to the display unit than the first distance range. The optical sensor unit is configured to recognize the received light based on the hand being located within the first distance range, and the touch sensor unit is configured to recognize the hand based on the hand being located within the second distance range. The processor can cause the touch sensor unit to operate based on a determination that the hand has transitioned from being located within the first distance range to being located within the second distance range.

18 Claims, 14 Drawing Sheets

(51) Int. Cl.
  *G06F 3/01* (2006.01)
  *G06F 3/048* (2013.01)
  *G06F 1/16* (2006.01)
  *G06K 7/10* (2006.01)
  *G06F 3/033* (2013.01)
  *G06F 3/042* (2006.01)
  *G06F 3/0482* (2013.01)
  *G06F 3/16* (2006.01)
  *G06F 3/0484* (2013.01)
  *B60K 37/00* (2006.01)
  *G06F 3/0488* (2013.01)
  *G06F 3/03* (2006.01)
  *G06F 3/044* (2006.01)

(52) U.S. Cl.
  CPC ............ *G06F 3/044* (2013.01); *G06F 3/0482* (2013.01); *G06F 3/0488* (2013.01); *G06F 3/04842* (2013.01); *G06F 3/16* (2013.01); *G06F 2203/04101* (2013.01)

(56) References Cited

U.S. PATENT DOCUMENTS

| | | | | |
|---|---|---|---|---|
| 2009/0309851 A1* | 12/2009 | Bernstein | .............. | G06F 3/0416 345/174 |
| 2009/0315848 A1* | 12/2009 | Ku | ........................ | G06F 3/0416 345/173 |
| 2011/0037730 A1* | 2/2011 | Wang | .................... | G06F 3/0428 345/175 |
| 2011/0141063 A1* | 6/2011 | Grundmann | ........... | B60K 35/00 345/175 |
| 2012/0274550 A1* | 11/2012 | Campbell | ........... | G06F 3/04883 345/156 |
| 2012/0281018 A1* | 11/2012 | Yamamoto | ............ | G06F 1/1626 345/634 |
| 2013/0222332 A1* | 8/2013 | Kyrynyuk | ............. | G06F 3/0416 345/174 |
| 2013/0285797 A1* | 10/2013 | Paulsen | .............. | G06K 7/10207 340/10.5 |
| 2013/0307810 A1* | 11/2013 | Verweg | .................. | G06F 3/0412 345/174 |
| 2013/0314365 A1 | 11/2013 | Woolley et al. | | |
| 2013/0342491 A1 | 12/2013 | Liu et al. | | |
| 2014/0267025 A1* | 9/2014 | Kim | ........................ | G06F 3/017 345/156 |
| 2015/0062458 A1* | 3/2015 | Nakamura | .............. | G06F 3/047 349/12 |
| 2015/0169114 A1* | 6/2015 | King | ..................... | G06F 3/0416 345/174 |

FOREIGN PATENT DOCUMENTS

| | | | | |
|---|---|---|---|---|
| CN | 101876869 | | 11/2010 | |
| CN | 102037648 | | 4/2011 | |
| CN | 102150114 | | 8/2011 | |
| CN | 102239470 | | 11/2011 | |
| CN | 102681750 | | 9/2012 | |
| EP | 1983402 | | 10/2008 | |
| JP | 2004-071233 | | 3/2004 | |
| JP | 2013-145174 | | 7/2013 | |
| KR | 10-2009-0095286 | * | 10/2009 | ......... G02F 1/13357 |
| KR | 10-2011-0008313 | | 1/2011 | |
| KR | 10-2011-0037730 | * | 4/2011 | ......... G02F 1/13357 |
| KR | 10-2013-0111910 | | 10/2013 | |
| KR | 10-2013-0140188 | | 12/2013 | |
| NL | WO 2006/003588 | * | 1/2006 | ............. G06F 3/033 |

OTHER PUBLICATIONS

Office Action issued in Korean Application No. 10-2014-0048217 dated Dec. 1, 2015, 6 pages.
European Search Report dated Jul. 22, 2015 from corresponding European Patent Application No. 15111174.0, 7 pages.
Chinese Office Action in Chinese Application No. 201510192556.X, dated Jul. 19, 2017, 23 pages (with English translation).

* cited by examiner

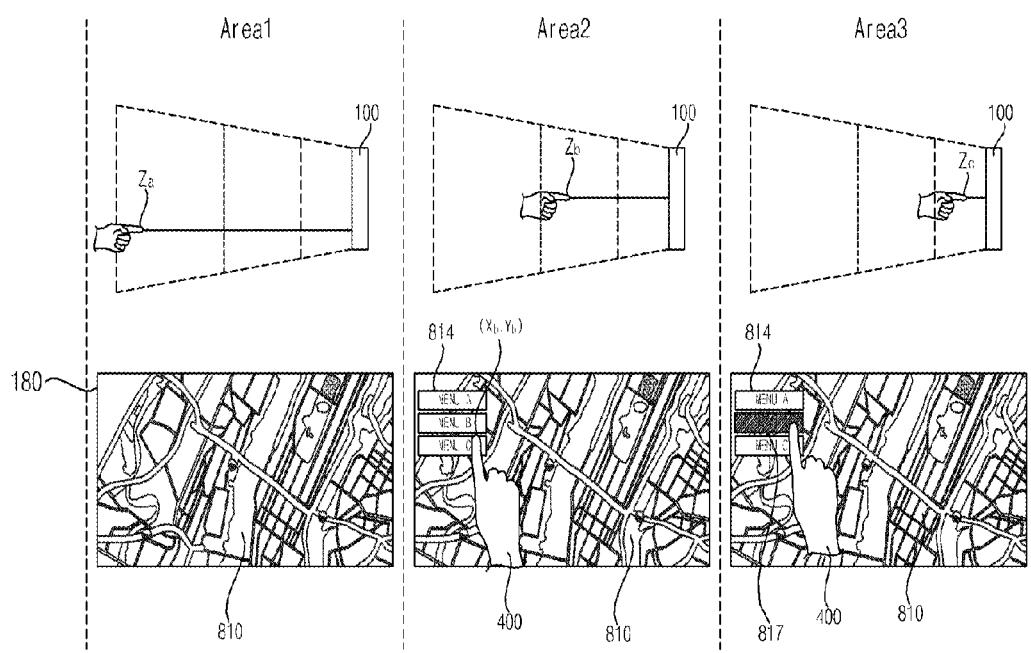

DISPLAY APPARATUS FOR A VEHICLE

CROSS-REFERENCE TO RELATED APPLICATION

This application claims the benefit of Korean Patent Application No. 10-2014-0048217, filed on Apr. 22, 2014, in the Korean Intellectual Property Office, the disclosure of which is incorporated herein by reference.

FIELD

The present disclosure relates to a display apparatus for vehicles and, more particularly, to a display apparatus for vehicles that may improve user convenience.

BACKGROUND

In general, vehicles are devices in which a user may travel in a desired direction. For example, vehicles may include automobiles.

Various researches on display apparatuses providing various pieces of information for a user riding in a vehicle are underway. For example, 3D interaction technology includes sensing Z-axis input in addition to sensing of X-axis and Y-axis input.

SUMMARY

An object of the present disclosure is to provide a display apparatus for vehicles which may improve user convenience.

Another object of the present disclosure is to provide a display apparatus for vehicles which may continuously track user approach to the display apparatus.

The objects of the present disclosure are not limited to the above-mentioned objects and other objects that have not been mentioned above will become evident to those skilled in the art from the following description.

To achieve the above objects, there is provided a display apparatus for vehicles according to an exemplary implementation of the present disclosure, including a display unit, an optical sensor unit to receive light corresponding to output light, a touch sensor unit disposed on the upper or lower surface of the display unit, and a processor to control the touch sensor unit to operate, if a user hand located within a first distance where the received light is recognizable approaches the display unit within a second distance more proximate to the display unit than the first distance.

According to one aspect, a vehicle has a display apparatus, and the display apparatus includes a display unit, an optical sensor unit configured to emit and receive light, a touch sensor unit disposed on or below a surface of the display unit, and a processor configured to (i) determine whether a hand is located within a first distance range away from the display unit, the optical sensor unit being configured to recognize the received light based on the hand being located within the first distance range, and to (ii) determine whether the hand is located within a second distance range away from the display unit that is closer to the display unit than the first distance range, the touch sensor unit being configured to recognize the hand based on the hand being located within the second distance range. The processor is configured to cause the touch sensor unit to operate based on a determination that the hand has transitioned from being located within the first distance range to being located within the second distance range.

According to another aspect, a display apparatus for a vehicle includes a display unit, an optical sensor unit configured to emit and receive light, a touch sensor unit disposed on or below a surface of the display unit, and a processor configured to (i) determine whether a hand is located within a first distance range away from the display unit, the optical sensor unit being configured to recognize the received light based on the hand being located within the first distance range, and to (ii) determine whether the hand is located within a second distance range away from the display unit that is closer to the display unit than the first distance range, the touch sensor unit being configured to recognize the hand based on the hand being located within the second distance range. The processor is configured to cause the touch sensor unit to operate based on a determination that the hand has transitioned from being located within the first distance range to being located within the second distance range.

Implementations according to this aspect may include one or more of the following features. For example, the processor may be configured to determine that the hand has transitioned from being located within the first distance range to being located within the second distance range based on information received from the optical sensor unit and the touch sensor unit. The processor may be configured to calculate position information of the hand using the emitted light and the received light based on the hand being located within the first distance range, and the processor may be configured to calculate position information of the hand using capacitance change sensed by the touch sensor unit based on the hand being located within the second distance range and not in contact with the display unit. The processor may be configured to calculate a position information of the hand using the emitted light and the received light based on the hand being located within the first distance range, and the processor may be configured to calculate a position information of the hand using the emitted light and the received light and further using capacitance change sensed by the touch sensor unit based on the hand being located within the second distance range and not in contact with the display unit. The processor may be configured to calculate a distance information of the hand using the emitted light and the received light based on the hand being located within the first distance range, and the processor may be configured to calculate a position information of the hand using capacitance change sensed by the touch sensor unit based on the hand being located within the second distance range and not in contact with the display unit, where the position information includes x-axis, y-axis, and z-axis information of the hand. The touch sensor unit may include a plurality of touch sensing cells, and the processor may be configured to calculate a distance between the hand and the display unit and to correspondingly set the size of the plurality of touch sensing cells according to the calculated distance of the hand. The processor may be configured to decrease the size of the plurality of touch sensing cells as the calculated distance of the hand decreases and to calculate position information that corresponds to the size of the plurality of touch sensing cells. The processor may be configured to change the size of the plurality of touch sensing cells by causing an electrical signal applied to an electrode array within the touch sensor unit to change. The processor may be configured to set, based on determining that the hand is located within the second distance range, the size of the plurality of touch sensing cells to be a first size, and the processor may be configured to set, based on determining that the hand is located within a third distance range away from the display unit that is closer to the display unit than the second distance range, the size of the plurality of touch sensing cells to be a second size that is smaller than the first size. The plurality of touch sensing cells may be configured to emit capacitance change signals corresponding to the hand based on the hand being located within the second distance range, and the processor may be configured to, based on determining that the hand is located within the second distance range and that at least some of the plurality of touch sensing cells have emitted the capacitance change signals, calculate position information of the hand based on a capacitance change signal that has a highest intensity among the emitted capacitance change signals.

Further according to this aspect, the optical sensor unit may be disposed on a peripheral area of the display unit, and the processor may be configured to, based on determining that the hand is located within the first distance range in a region corresponding to the peripheral area of the display unit, calculate position information of the hand based on the emitted light and the received light. The optical sensor unit may include one or more optical output units configured to emit light and one or more optical reception units configured to receive light, the one or more optical output units and the one or more optical reception units being separate from each other. A peripheral area of the display unit may include a bezel frame and a plurality of noise control frame units disposed on the bezel frame, and each of the optical output units and the optical reception units may be disposed between adjacent of the plurality of noise control frame units. The display apparatus may further include an overlay disposed over the noise control frame units, where the optical sensor unit may be configured such that an air gap formed between the overlay and the optical reception units is larger than an air gap formed between the overlay and the optical output units. The processor may be configured to calculate position information of the hand and to control the display unit to display a menu item at an area of the display unit that corresponds to the calculated position information of the hand. The processor may be configured to, based on determining that the hand has transitioned from being located within the first distance range to being located within the second distance range, output an indicator configured to indicate that touch input via the touch sensor unit is enabled. The indicator may include a predetermined sound output for causing a corresponding sound to be played or a predetermined image output for causing a corresponding image to be displayed. The processor may be configured to, based on determining that the hand is not in contact with the display unit and further located within a third distance range away from the display unit that is closer to the display unit than the second distance range, highlight a specific item to be selected in a menu displayed on the display unit that corresponds to calculated position information of the hand. The processor may be configured to determine that the highlighted item has been selected based on the hand making contact with an area of the display unit corresponding to the highlighted item.

BRIEF DESCRIPTION OF THE DRAWINGS

The accompanying drawings, which are included to provide a further understanding of the application and are incorporated in and constitute a part of this application, illustrate implementation(s) of the application and together with the description serve to explain the principle of the application. In the drawings:

FIGS. 8 and 9a to 9c are views illustrating the operating method of FIG. 7.

DETAILED DESCRIPTION

The advantages and features of the present disclosure, and the way of attaining them, will become apparent with reference to implementations described below in conjunction with the accompanying drawings. Reference will now be made in detail to various implementations of the present disclosure, examples of which are illustrated in the accompanying drawings. Wherever possible, the same reference numbers will be used throughout the drawings to refer to the same or like parts.

Hereinafter, the terms "module" and "unit" used to signify components are used to promote the general understanding of disclosure and thus may not be referring to specific meanings or functions. Accordingly, the terms "module" and "unit" may be used interchangeably.

A vehicle described in the present specification may include an automobile, a motorcycle, and a bicycle, just to name a few. In the following descriptions, an automobile will be focused upon as a vehicle, but it will be understood that other types of vehicles may be used.

A display apparatus for vehicles described in the specification may be an audio video navigation (AVN) apparatus or the like.

Figure 1:
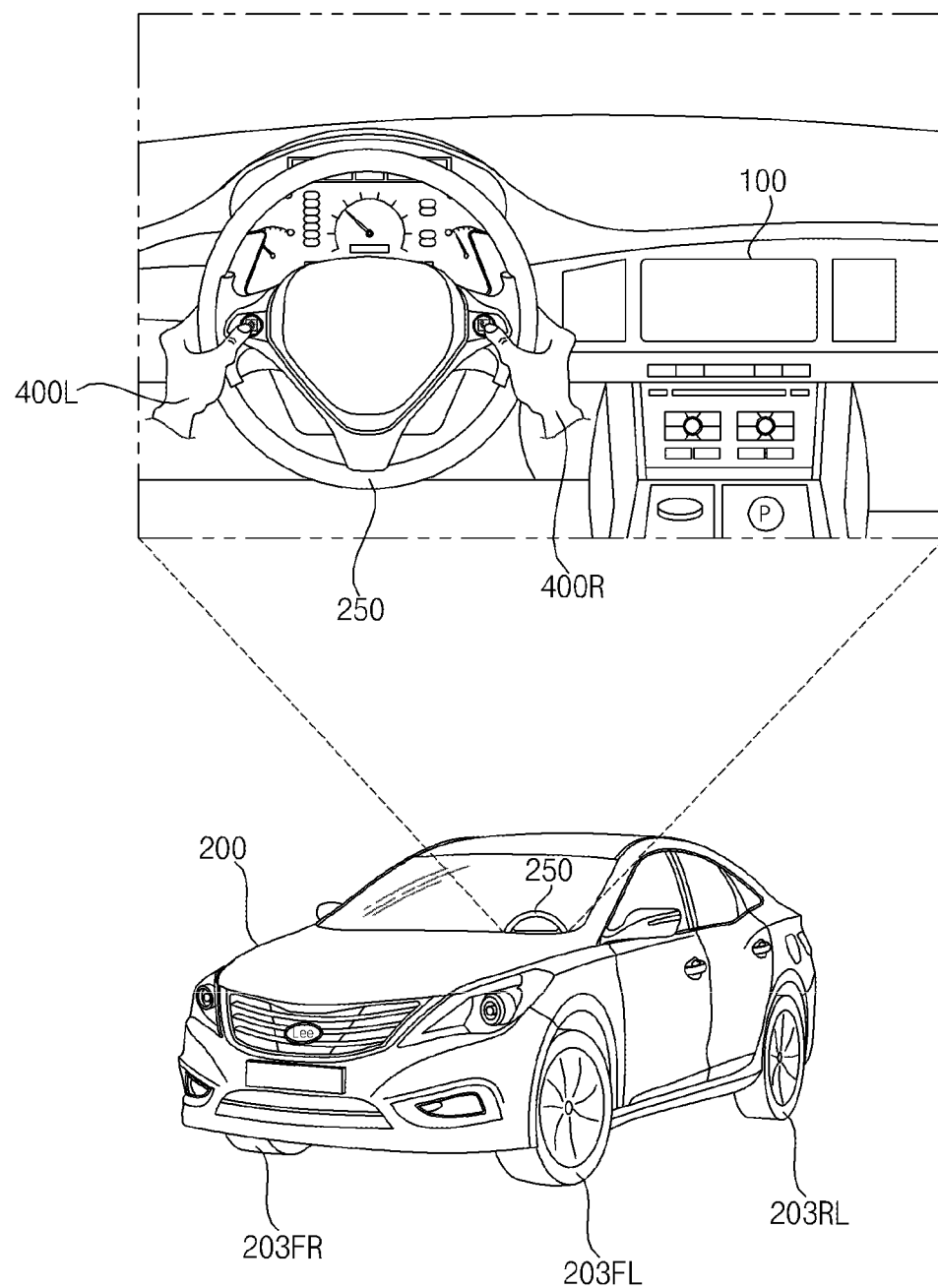
FIG. 1 is a perspective view illustrating an example display apparatus for vehicles in accordance with one implementation of the present disclosure.

Referring to FIG. 1, a vehicle 200 may include wheels 203FR, 203FL, 203RL, (with wheel 203RR being hidden behind vehicle 200 in FIG. 1) that can be rotated by a power source, a handle 250 to adjust the driving direction of the vehicle 200, and a display apparatus 100 to provide information to a user.

Here, the vehicle 200 may include an engine providing power based on fossil fuels or an electric motor providing power using a DC power supply, such as a solar cell or a battery. Further, the vehicle 200 may include a transmission converting power from the engine into rotary force and a brake to stop driving of the vehicle 200.

The vehicle 200 described in the specification may include a conventional vehicle having an engine, a hybrid vehicle having both an engine and an electric motor, and an electric vehicle having an electric motor.

The display apparatus 100 for vehicles in accordance with the implementation of the present disclosure is a display apparatus that can enable 3D interaction and thus be configured to perform proximity touch or space recognition, as further described below.

Particularly, if a user hand is located on the front surface of the display apparatus 100 and then successively approaches the display apparatus 100, the display apparatus 100 for vehicles in accordance with the implementation of the present disclosure may recognize all paths and sections of the hand and the position of the hand until touch input is carried out (i.e., hand detection) and further detect a motion of the fingers if a distance between the display apparatus 100 and the hand is within a third distance range L3 as shown in FIG. 4 (i.e., finger detection). Accordingly, the display apparatus 100 for vehicles may help improve, for example, a low success rate of proximity space recognition arising from reduced resolution or viewing angle.

Figure 3:
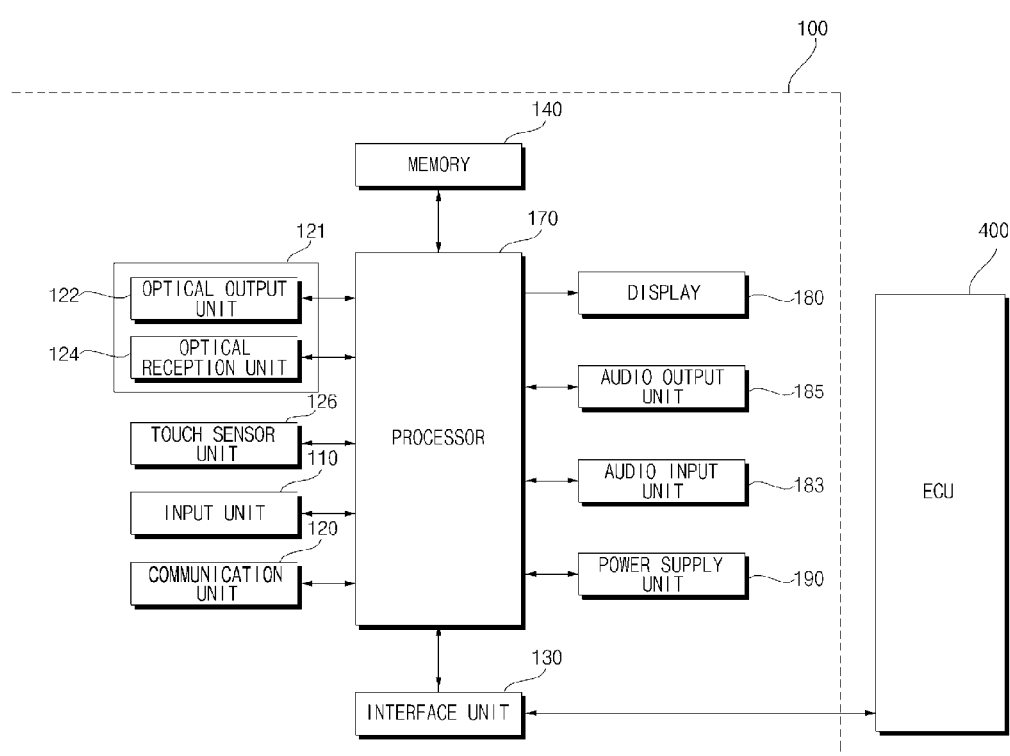
FIG. 3 is a block diagram of the display apparatus for vehicles of FIG. 1.

For this purpose, the display apparatus 100 for vehicles in accordance with the implementation of the present disclosure may include a display unit 180 as well as optical sensor units 121 to detect a user hand and a touch sensor unit 126 to detect user fingers, i.e., to sense floating touch (see FIG. 3).

In more detail, if a user hand 400 is located within a first distance range L1 (see FIG. 4*a*) away from the display apparatus 100, light output from optical output units 122 of the optical sensor units 121) of the display apparatus 100 may be reflected or scattered by the user hand 400 and then received by optical reception units 124 (see FIG. 3).

Referring also to FIG. 3, processor 170 may calculate position information corresponding to the position of the user hand 400 based on the light received by the optical reception units 124. In more detail, the processor 170 may calculate X-axis and Y-axis information with respect to the display apparatus 100. Further, the processor 170 may approximately calculate Z-axis information, i.e., a distance between the display apparatus 100 and the user hand 400, based on the intensity of the received light.

If the user hand 400 sequentially approaches the display apparatus 100, the processor 170 may successively calculate X-axis, Y-axis, and Z-axis information of the user hand 400 based on the light received by the optical reception units 124. Here, the Z-axis information may sequentially decrease.

Further, if the user hand 400 approaches the display apparatus 100 to be within a second distance range L2 (see FIG. 4*a*) more proximate to the display apparatus 100 than the first distance range L1, the touch sensor unit 126 may be operated by having power applied to it based upon this approach of the hand. That is, if the user hand 400 is located outside the second distance range L2 from the display apparatus 100, the touch sensor unit 126 may not be operated to, for example, reduce unnecessary power consumption. In some cases, the touch sensor unit 126 may remain in operation even when the user hand 400 is located outside the distance range L2 from the display apparatus 100.

The touch sensor unit 126 may sense floating touch and, for this purpose, may include an electrode array and an MCU. As such, if the touch sensor unit 126 is operated, an electrical signal is supplied to the electrode array and an electric field can be formed on the electrode array.

Further, if the user hand 400 approaches the display apparatus 100 to be positioned within a third distance range L3 (see FIG. 4*a*) that is more proximate to the display apparatus 100 than the second distance range L2, capacitance change may be generated in the electric field formed on the front surface of the display apparatus 100, and the touch sensor unit 126 can be configured to sense such capacitance change. Then, X-axis and Y-axis information of the floating touch input may be calculated based on the sensed capacitance change. Further, Z-axis information, i.e., a distance between the display apparatus 100 and the user hand 400, may be calculated based on the intensity of the capacitance change.

In some cases, when the user hand 400 moves from being within the second distance range L2 to being within the third distance range L3, the optical output units 122 may be turned off to stop outputting light. In some cases, when the user hand 400 moves from being within the third distance range L3 to being within the second distance range L2, the optical output units 122 that were turned off may be turned on to resume outputting light.

Change of grouping of the electrode array within the touch sensor unit 126 may be performed based on the distance information of the user hand calculated based on the optical sensor units 121, i.e., the Z-axis information. For example, the size of an electrode array group may be set to decrease as the distance between the user hand and the display unit 180 decreases.

That is, the size of touch sensing cells of the electrode array within the touch sensor unit 126 may vary based on the distance information of the user hand calculated based on the optical sensor units 121, i.e., the Z-axis information.

Figure 4A:
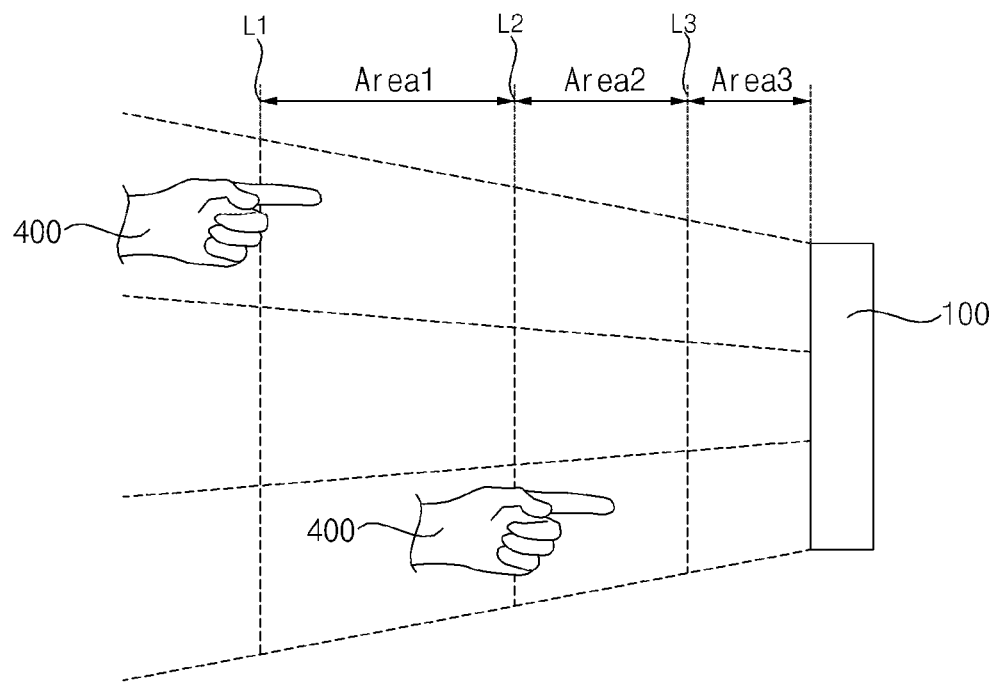
FIGS. 4a and 4b are views illustrating an example user hand recognition process by the display apparatus for vehicles of FIG. 1.

As one example, referring to FIG. 4*a*, if the distance of the user hand from the display apparatus 100 is within the second distance range L2, the electrode array may be grouped such that the size of touch sensing cells (grouping electrodes) may be a first size corresponding to 9 electrode cells, and, if the distance of the user hand from the display apparatus 100 is within the third distance range L3 that is less than the second distance range L2, the electrode array may be grouped such that the size of touch sensing cells (grouping electrodes) may be a second size corresponding to 4 electrode cells.

As another example, if the distance of the user hand from the display apparatus 100 is within the second distance range L2, the electrode array may be grouped such that the size of touch sensing cells (grouping electrodes) may be a first size corresponding to 4 electrode cells, and, if the distance of the user hand from the display apparatus 100 is within the third distance range L3 that is less than the second distance range L2, the electrode array may be grouped such that the size of the touch sensing cells (grouping electrodes) may be a second size corresponding to 1 electrode cell.

That is, the size of the touch sensing cells may be set to decrease as the distance between the user hand and the display unit 180 decreases.

Change of the size of the touch sensing cells (grouping electrodes) may be performed by change of an electrical signal applied to the electrode array.

As one example, if the size of the touch sensing cells (grouping electrodes) is a size corresponding to 9 electrode cells, the size of the touch sensing cells (grouping electrodes) corresponding to 9 electrode cells may be set by applying an electrical signal only to a first horizontal electrode and a fourth horizontal electrode among first to fourth horizontal electrodes and to a first vertical electrode and a fourth vertical electrode among first to fourth vertical electrodes.

As another example, if the size of the touch sensing cells (grouping electrodes) is a size corresponding to 4 electrode cells, the size of the touch sensing cells (grouping electrodes) corresponding to 4 electrode cells may be set by applying an electrical signal only to a first horizontal electrode and a third horizontal electrode among first to third horizontal electrodes and to a first vertical electrode and a third vertical electrode among first to third vertical electrodes.

As yet another example, if the size of the touch sensing cells (grouping electrodes) is a size corresponding to 1 electrode cell, the size of the touch sensing cells (grouping electrodes) corresponding to 1 electrode cell may be set by applying an electrical signal to respective horizontal electrodes and respective vertical electrodes.

Consequently, the intensity of power consumed by the electrode array within the touch sensor unit 126 may be changed according to the distance of the user hand from the display apparatus 100.

If a user hand, particularly, a user finger, approaches the display apparatus 100 to be within the third distance range L3, the touch sensor unit 126 may sense capacitance change caused by the user finger in an electric field formed on the front surface of the display apparatus 100. Then, the processor 170 may calculate X-axis and Y-axis information of floating touch input based on the sensed capacitance change. Further, the processor 170 may calculate Z-axis information, i.e., a distance between the display apparatus 100 and the user finger, based on the intensity of the capacitance change.

FIGS. 2a to 2e illustrate example structures of the display apparatus for vehicles of FIG. 1.

Figure 2A:
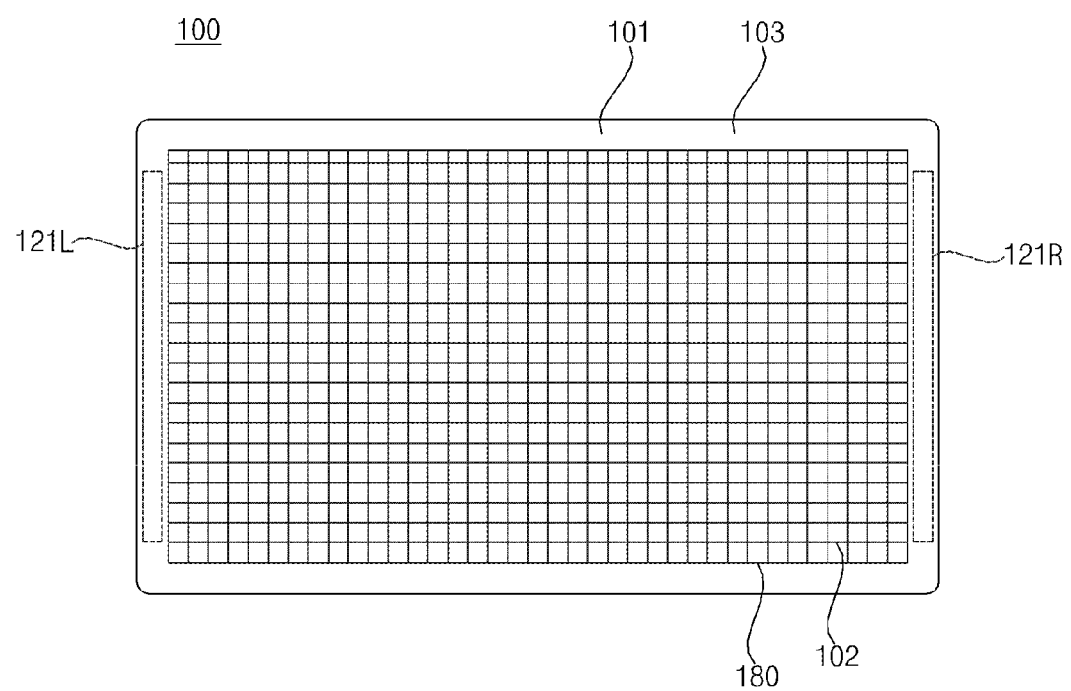
FIGS. 2a to 2e are views illustrating the structure of the display apparatus for vehicles of FIG. 1.
Figure 2B:
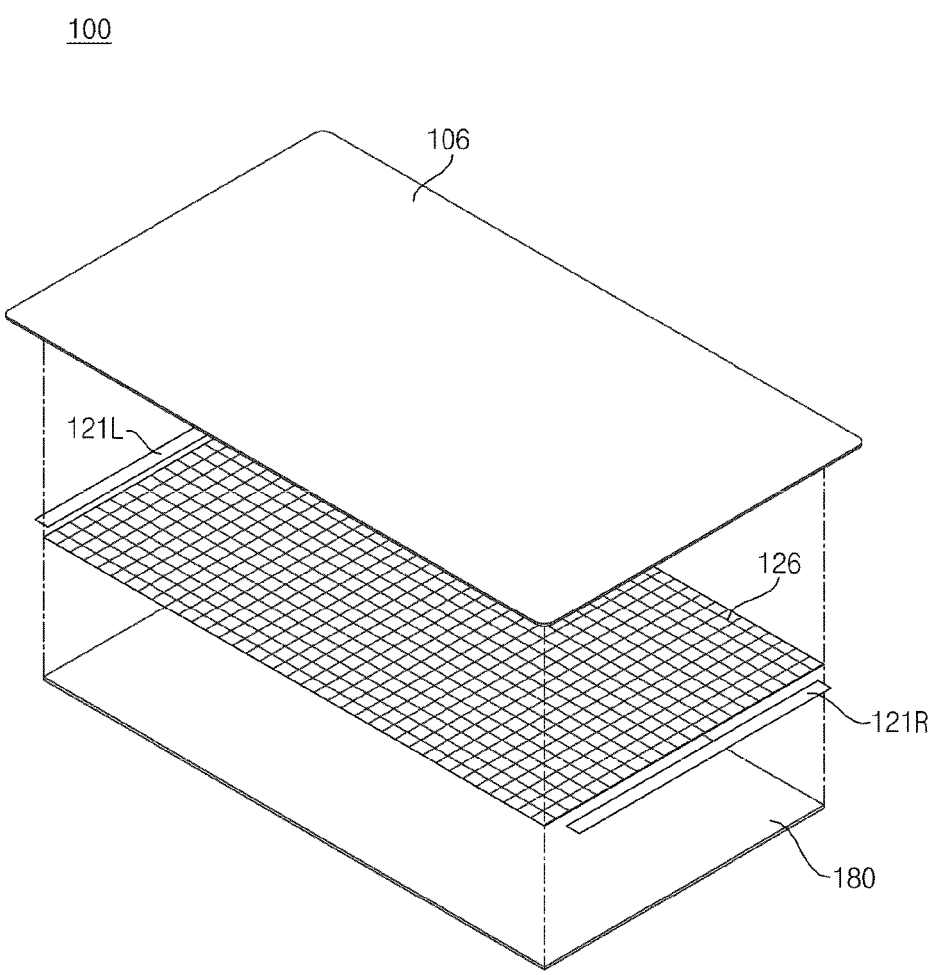

Referring to FIGS. 2a and 2b, the display apparatus 100 may include a display area 102 and a peripheral area 101 corresponding to an edge area around the display area 102.

A display unit 180 and a touch sensor unit 126 may be disposed in the display area 102, and a bezel frame 103 and optical sensor units 121 may be disposed in the peripheral area 101.

Although FIG. 2b illustrates optical sensor units 121L and 121R as being disposed at the left and right sides of the peripheral area 101, the positions of the optical sensor units are not limited thereto. Each of the optical sensor units 121L and 121R of FIG. 2b may be formed in a module in which optical output units and optical reception units are combined.

FIG. 2b illustrates that the touch sensor unit 126 may be disposed under an overlay 106 and the display unit 180 disposed under the touch sensor unit 126.

A user finger may contact the overlay 106, and the overlay 106 may include conductive elements to sense capacitance. The overlay 106 may contact the touch sensor unit 126, for example, the electrode array in the touch sensor unit 126.

The area of the touch sensor unit 126 may be the same as the area of the display unit 180. Accordingly, the touch sensor unit 126 may be able to sense touch input throughout the entirety of the display unit 180.

The touch sensor unit 126 may sense user finger approach within a predetermined distance as well as direct touch of the display apparatus 100. This may be referred to as floating touch or hovering. Hereinafter, the term "floating touch" will be used in the descriptions.

Figure 2C:
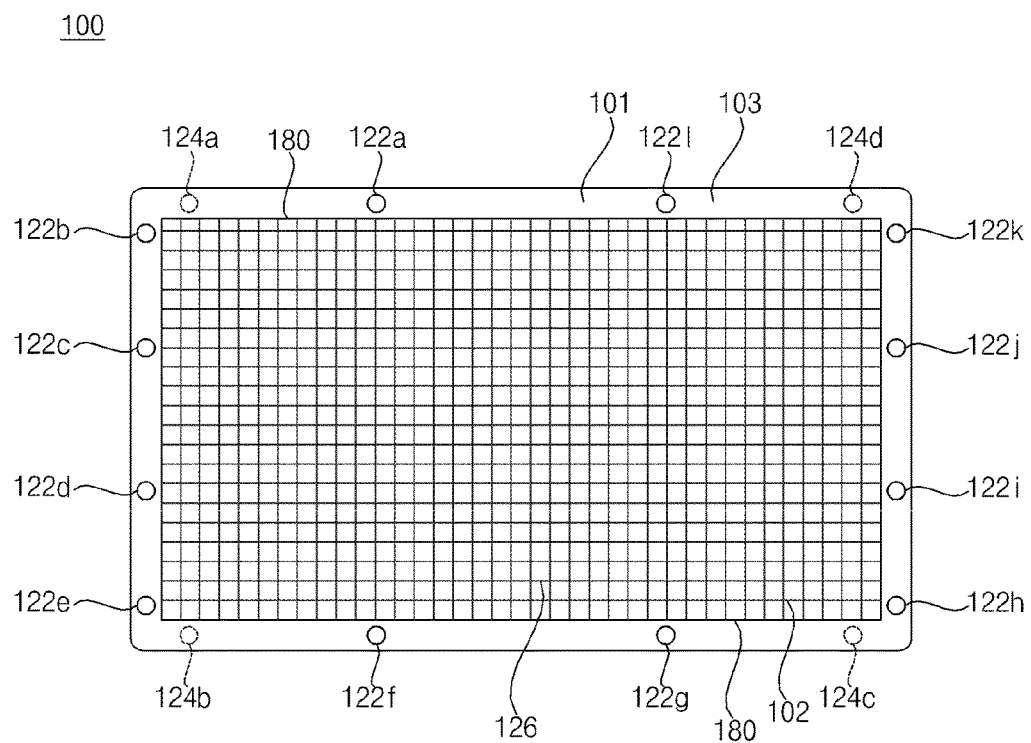
Figure 2D:
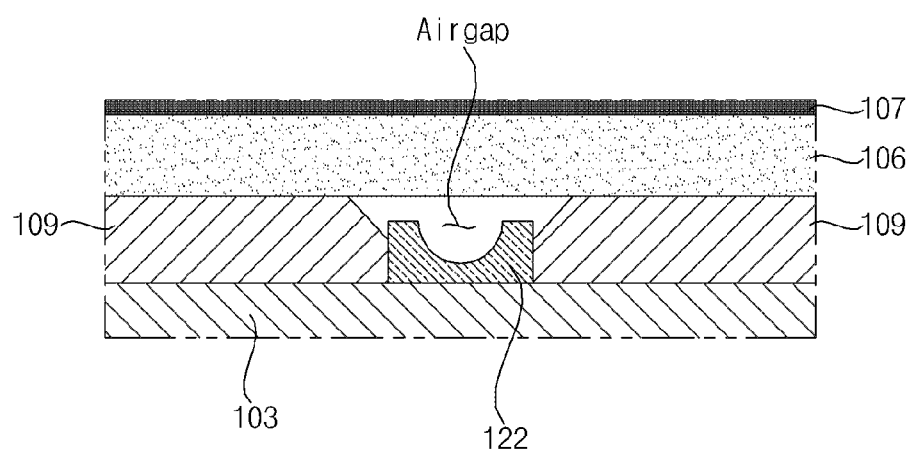
Figure 2E:
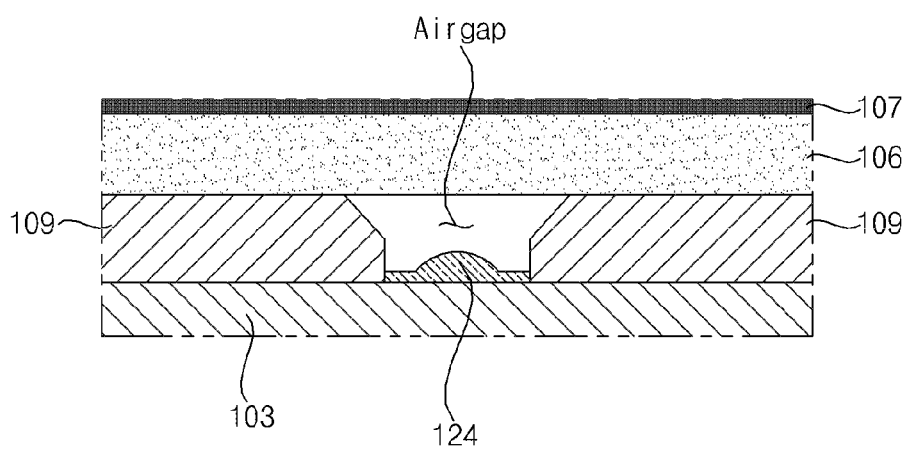

Next, FIGS. 2c to 2e illustrate another example of the display apparatus of FIG. 1. Particularly, FIG. 2c shows a front view of the example of the display apparatus of FIG. 1, and FIGS. 2d and 2e show cross-sectional views of an optical output unit and an optical reception unit of FIG. 2c.

With reference to FIG. 2c, the display apparatus 100 may include a display area 102 and a peripheral area 101 corresponding to an edge area around the display area 102.

A display unit 180 and a touch sensor unit 126 may be disposed in the display area 102, and a bezel frame 103 and optical output units and optical reception units in optical sensor units 121 may be disposed in the peripheral area 101.

Particularly, FIG. 2c exemplarily illustrates that optical output units 122a, 122b, 122c, 122d, 122e, 122f, 122g, 122h, 122i, 122j, 122k, and 122l and optical reception units 124a, 124b, 124c, and 124d may be disposed on the bezel frame 103 in the peripheral area 101.

The optical output units 122a, 122b, 122c, 122d, 122e, 122f, 122g, 122h, 122i, 122j, 122k, and 122l and the optical reception units 124a, 124b, 124c, and 124d may be separated from one another, and the number of the optical output units 122a, 122b, 122c, 122d, 122e, 122f, 122g, 122h, 122i, 122j, 122k, and 122l may be greater than the number of the optical reception units 124a, 124b, 124c, and 124d. As such, optical output from the display apparatus 100 may be uniform.

FIG. 2d shows a cross-sectional view of the optical output unit 122. The optical output unit 122 may be disposed between noise control frame units 109 on the bezel frame 103. Straightness of light output from the optical output unit 122 may be improved by disposing the optical output unit 122 between noise control frame units 109.

Further, the overlay 106 and an optical filter unit 107 may be disposed on the optical output unit 122 and the noise control frame units 109.

FIG. 2e shows a cross-sectional view of the optical reception unit 124. The optical reception unit 124 may be disposed between the noise control frame units 109 on the bezel frame 103. Reception performance of light received by the optical reception unit 124 may be improved by disposing the optical reception unit 124 between noise control frame units 109.

Further, the overlay 106 and the optical filter unit 107 may be disposed on the optical reception unit 124 and the noise control frame units 109.

Referring to both FIGS. 2d and 2e, an air gap is present between the optical output unit 122 and the overlay 106 and between the optical reception unit 124 and the overlay 106. In some cases, the air gap between the optical reception unit 124 and the overlay 106 may be greater than the air gap between the optical output unit 122 and the overlay 106. As such, the optical output unit 122 may perform optical output more effectively while the optical reception unit 124 may perform optical reception more effectively.

Referring to FIG. 3, the display apparatus 100 for vehicles in accordance with the implementation of the present disclosure may include an input unit 110, a communication unit 120, the optical sensor units 121, the touch sensor unit 126, an interface unit 130, a memory 140, the processor 170, the display unit 180, an audio input unit 183, an audio output unit 185, and a power supply unit 190.

The input unit 110 may include buttons attached to the display apparatus 100. For example, the input unit 110 may include a power button. In addition, the input unit 110 may include at least one of a menu button, up and down adjustment buttons, and left and right adjustment buttons.

A signal input through the input unit 110 may be transmitted to the processor 170.

The communication unit 120 may exchange data with an adjacent electronic apparatus. For example, the communication unit 120 may exchange data with an electronic apparatus within a vehicle or a server through a wireless communication method. Particularly, the communication unit 120 may exchange data with a mobile terminal of a vehicle driver wirelessly. As the wireless data communication method, various data communication methods, such as Bluetooth, Wi-Fi, APiX, etc., may be employed.

For example, if a user rides in a vehicle, the display apparatus 100 and a user mobile terminal may perform pairing automatically or upon user execution of an application.

The communication unit 120 may include a GPS reception device and receive GPS information, i.e., position information of the vehicle, through the GPS reception device.

The optical sensor unit 121 outputs light and receives light corresponding to the output light so as to sense a user hand located on the front surface of the display apparatus 100. An electrical signal based on the received light may be processed by the processor 170.

For this purpose, the optical sensor unit 121 may include the optical output units 122 and the optical reception units 124.

The optical output units 122 may output, for example, infrared (IR) light, to sense the user hand located on the front surface of the display apparatus 100.

If the light output from the optical output units 122 is scattered or reflected by the user hand located on the front surface of the display apparatus 100, the optical reception units 124 receives scattered or reflected light. In more detail, the optical reception units 124 may include photodiodes and convert the received light into electrical signals through the photodiodes. The converted electrical signals are input to the processor 170.

The touch sensor unit 126 senses floating touch or direct touch. For this purpose, the touch sensor unit 126 may include an electrode array and an MCU. If the touch sensor unit 126 is operated, an electrical signal is supplied to the electrode array and thus, an electric field is formed on the electrode array.

The touch sensor unit 126 may be operated if the intensity of light received by the optical sensor units 121 is a first level or more.

That is, if the user hand approaches the display apparatus 100 to be positioned within a predetermined distance, an electrical signal may be supplied to the electrode array within the touch sensor unit 126. An electric field may then be formed on the electrode array as a result of the electrical signal supplied to the electrode array, and the touch sensor unit 126 may sense capacitance change using such an electric field. Then, the touch sensor unit 126 senses floating touch or direct touch based on the sensed capacitance change.

In addition to X-axis and Y-axis information, Z-axis information may be sensed through the touch sensor unit 126 according to approach of the user hand.

The interface unit 130 may exchange data with other electronic apparatuses within the vehicle. For example, the interface unit 130 may perform data communication with an ECU within the vehicle through a wired communication method.

In more detail, the interface unit 130 may receive vehicle state information by data communication with the ECU within the vehicle.

Here, the vehicle state information may include at least one of battery information, fuel information, vehicle velocity information, tire information, steering information by handle rotation, vehicle lamp information, vehicle inner temperature information, vehicle outer temperature information, and vehicle inner humidity information.

In addition, the interface unit 130 may receive GPS information from the ECU within the vehicle. Additionally, or alternatively, the interface unit 130 may transmit GPS information received from the display apparatus 100 to the ECU.

The memory 140 may store various pieces of data to perform the overall operation of the display apparatus 100, such as programs for processing or control in the processor 170.

As one example, the memory 140 may store a map to guide the driving path of the vehicle. As another example, the memory 140 may store user information and user mobile terminal information to perform pairing with the mobile terminal of a user.

The audio output unit 185 can convert the electrical signal from the processor 170 into an audio signal. For this purpose, the audio output unit 185 may include a speaker. The audio output unit 185 may output sound corresponding to operation of the input unit 110, i.e., the button of the input unit 110.

The audio input unit 183 may receive user voice. For this purpose, the audio input unit 183 may include a microphone. The audio input unit 183 may convert the received voice into an electrical signal and transmit the converted electrical signal to the processor 170.

The processor 170 controls the overall operation of the respective units within the display apparatus 100 for vehicles.

For example, the processor 170 may change the function of at least one of the plural buttons based on an operation signal of the input unit 110 by a user.

If a user hand is located on the front surface of the display apparatus 100 and then sequentially approaches the display apparatus 100, the processor 170 may recognize all paths and sections and position of the hand until touch input is carried out (hand detection), and further detect the fingers if a distance between the display apparatus 100 and the hand comes within the third distance range L3 (finger detection).

In more detail, referring also to FIG. 4, if the user hand 400 is located within the first distance range L1 from the display apparatus 100 and, particularly, located between the first distance range L1 and the second distance range L2, the processor 170 receives an electrical signal corresponding to light received by the optical sensor units 121. The processor 170 may then calculate position information corresponding to the position of the user hand based on the electrical signal from the optical sensor units 121. In more detail, the processor 170 may calculate X-axis and Y-axis information of the user hand with respect to the display apparatus 100. Further, the processor 170 may approximately calculate a distance between the display apparatus 100 and the user hand, i.e., Z-axis information, based on the strength (or magnitude or amplitude) of the electrical signal from the optical sensor units 121.

If the user hand successively approaches the display apparatus 100, the processor 170 may successively calculate X-axis, Y-axis, and Z-axis information of the user hand based on light received by the optical reception units 124. Here, the Z-axis information may sequentially decrease.

If the user hand 400 approaches the display apparatus 100 to be within the second distance range L2 more proximate to the display apparatus 100 than the first distance range L1, the processor 170 may operate the touch sensor unit 126. That is, if the strength of the electrical signal from the optical sensor units 121 is a reference level or more, the processor 170 may operate the touch sensor unit 126. Accordingly, the electrical signal may be supplied to the electrode array within the touch sensor unit 126.

Further, if the user hand 400 is located within the second distance range L2 from the display apparatus 100, the processor 170 may sense floating touch based on a sensing signal sensed by the touch sensor unit 126.

The processor 170 may calculate X-axis and Y-axis information of floating touch input based on such a sensing signal and calculate a distance between the user hand and the display apparatus 100, i.e., Z-axis information, based on the intensity of capacitance change.

Further, the processor 170 may change a grouping of the electrode array within the touch sensor unit 126 according to the distance of the user hand from the display apparatus 100.

In more detail, the processor 170 may change grouping of the electrode array within the touch sensor unit 126 based on approximate Z-axis information calculated based on light received by the optical sensor units 121. The size of an electrode array group may be set to increase, for example, as the distance between the user hand and the display apparatus 100 increases.

That is, the processor 170 may change the size of touch sensing cells of the electrode array within the touch sensor unit 126 based on distance information of the user hand, i.e., Z-axis information.

For example, if the distance of the user hand from the display apparatus 100 is within the second distance range L2, the size of touch sensing cells (grouping electrodes) may be a size corresponding to 4 electrode cells and, if the distance of the user hand from the display apparatus 100 is within the third distance range L3 that is less than the second distance range L2, the size of the touch sensing cells (grouping electrodes) may be a size corresponding to 1 electrode cell.

Size change of the touch sensing cells (grouping electrodes) may be performed by changing the electrical signal applied to the electrode array.

As one example, if the size of the touch sensing cells (grouping electrodes) is a size corresponding to 4 electrode cells, the size of the touch sensing cells (grouping electrodes) corresponding to 4 electrode cells may be set by applying an electrical signal only to a first horizontal electrode and a third horizontal electrode among first to third horizontal electrodes and to a first vertical electrode and a third vertical electrode among first to third vertical electrodes.

As another example, if the size of the touch sensing cells (grouping electrodes) is a size corresponding to 1 electrode cell, the size of the touch sensing cells (grouping electrodes) corresponding to 1 electrode cell may be set by applying an electrical signal to respective horizontal electrodes and respective vertical electrodes.

Consequently, the intensity of power consumed by the electrode array within the touch sensor unit 126 may be changed according to the distance of the user hand from the display apparatus 100. As the distance of the user hand from the display apparatus 100 decreases, the intensity of power consumed by the electrode array within the touch sensor unit 126 increases.

The touch sensor unit 126 can sense capacitance change caused by a user finger in an electric field formed on the front surface of the display apparatus 100. The processor 170 may calculate X-axis and Y-axis information of floating touch based on such sensed capacitance change. Further, the processor 170 may calculate a distance between the display apparatus 100 and the user finger, i.e., Z-axis information, based on the intensity of the capacitance change.

In use, if capacitance change signals due to a user hand in some of set plural touch sensing cells are emitted during the condition that the user hand is located within the second distance range L2, the processor 170 may calculate position information of the user hand based on the capacitance change signal having the greatest intensity among the emitted capacitance change signals. That is, only one touch among plural floating touches may be recognized. In some cases, all of the plural floating touches may be recognized. However, when the plural floating touches are recognized, only touches having intensities of capacitance change that are a predetermined value or more may be recognized.

If a user hand is located in the peripheral area 101 within the first distance range L1, the processor 170 may perform calculation of position information of the user hand based on output light and light received by the optical sensor units 121. That is, if position information of the user hand is calculated, the processor 170 may calculate the position information by the optical sensor units 121 although the user hand is located not only in the display area 102 but also in the peripheral area 101 around the display area 102. This is enabled by the optical sensor units 121 being disposed in the peripheral area 101.

The touch sensor unit 126 may be disposed on the upper or lower surface of the display unit 180. Therefore, if a user hand is located in an area corresponding to the display area 102 within the second distance range L2, recognition of the user hand may be performed. However, if the user hand is located in the peripheral area 101 around the display area 102, recognition of the user hand may not be accurately performed.

That is, the range of an X-axis and Y-axis based region recognizable by the optical sensor units 121 is broader than the range of an X-axis and Y-axis based region recognizable by the touch sensor unit 126.

If a user hand approaches the second distance from the first distance, the processor 170 may output an indicator indicating that touch input is enabled. For example, the indicator may include a predetermined sound output through the audio output unit 185 or a predetermined image output through the display unit 180. Further, the processor 170 may cause to be displayed a corresponding menu on the display unit 180 based on the calculated position information of the user hand.

In some cases, the processor 170 may highlight a specific item in the menu displayed on the display unit 180 based on the calculated position information of the user hand.

Further, the processor 170 may select or highlight a specific item in the menu displayed on the display unit 180 based on the calculated position information of the user hand. In some cases, if the calculated distance of the user hand is within the second distance, the processor 170 may display a menu on the display unit 180 and, if the calculated distance of the user hand is within the third distance, the processor 170 may select or highlight a specific item in the menu displayed on the display unit 180 based on the calculated position information of the user hand.

The display unit 180 may separately display images corresponding to set functions of the buttons. In order to display these images, the display unit 180 may be implemented as various display modules, such as an LCD, an OLED, etc. Further, the display unit 180 may be implemented as a cluster on the front surface of the inside of the vehicle.

The power supply unit 190 may supply necessary power to operate the respective elements under control of the processor 170.

Figure 4B:
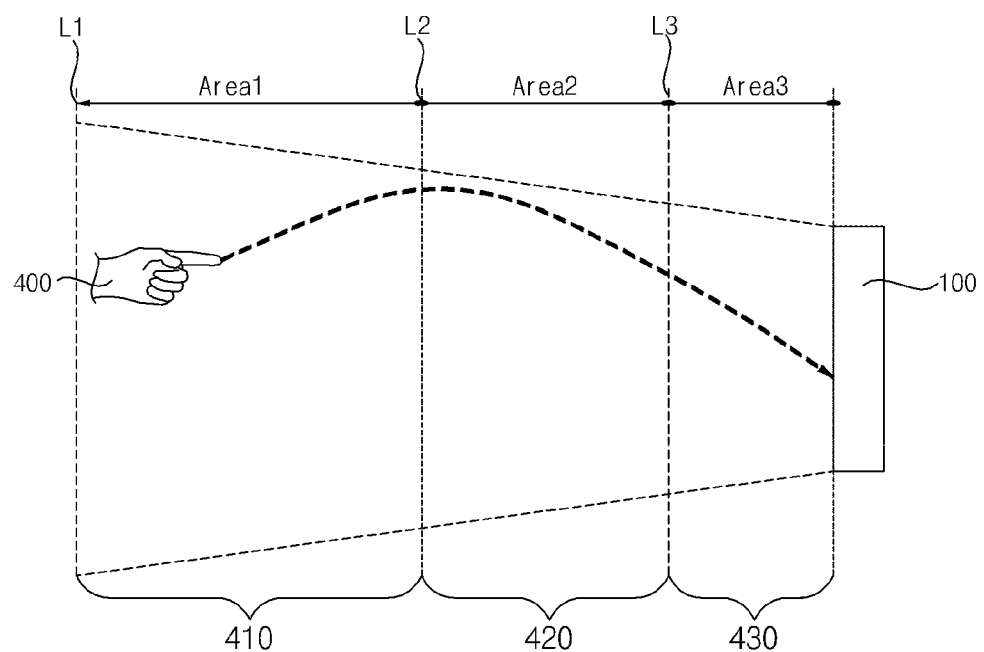

FIGS. 4*a* and 4*b* illustrate the recognition of a user hand by the display apparatus for vehicles of FIG. 1.

Specifically, FIG. 4*a* illustrates a user hand 400 being located on the front surface of the display apparatus 100 and then sequentially approaches the display apparatus 100.

If a user hand is located on the front surface of the display apparatus 100 and then sequentially approaches the display apparatus 100, the display apparatus 100 in accordance with the implementation of the present disclosure may recognize all paths and sections and position of the hand until touch input is carried out (hand detection) and detect fingers (finger detection) if the user hand approaches closer to the display apparatus 100 (finger detection).

For this purpose, the display apparatus 100 includes the optical sensor units 121 and the touch sensor unit 126.

The approach path of the user hand to the display apparatus 100 may be divided, as exemplarily shown in FIG. 4b.

That is, the approach path may be divided into an area 1 (410) between the first distance range L1 and the second distance range L2, an area 2 (420) between the second distance range L2 and the third distance range L3, and an area 3 (430) within the third distance range L3.

The area 1 may be an output light dispersion area in which light output from the optical sensor units 121 is dispersed. The area 1 is most distant from the display apparatus 100 and may be referred to as an emerging area.

The area 2 and the area 3 may be electric field dispersion areas in which an electric field generated by the touch sensor unit 126 due to operation of the touch sensor unit 126 is dispersed.

Particularly, the area 2 may be an area in which the touch sensor unit 126 is operated according to the distance calculated based on the light output from the optical sensor units 121 and the received light. Therefore, the area 2 may be referred to as an approaching area.

Since the area 2 and the area 3 may be the electric field dispersion areas, floating touch in the area 2 and the area 3 may be possible but the sizes of the touch sensing cells of the area 2 and the area 3 may be different.

That is, the size of the touch sensing cells of the area 3 may be smaller than the size of the touch sensing cells of the area 2 and, thus, the area 3 may be able to more finely detect position information of the user hand.

Consequently, in the area 3, pointing or targeting of the user hand is possible. Therefore, the area 3 may be referred to as a targeting area.

In the area 2, light output from the optical sensor units 121 may be dispersed. Therefore, the area 2 may be an overlap area in which the electric field generated by the touch sensor unit 126 and the output light overlap.

Accordingly, the display apparatus 100 may detect motion of the user hand within the area 1 through the optical sensor units 121 and detect presence of the user hand within the area 2 and the area 3 through the touch sensor unit 126.

In some cases, the processor 170 may determine in which area, for example among areas 1 through 3, the user hand is located based on information from optical sensor units 121. Alternatively, or additionally, the processor 170 may determine in which area the user hand is located based on information from the touch sensor unit 126.

Figure 5:
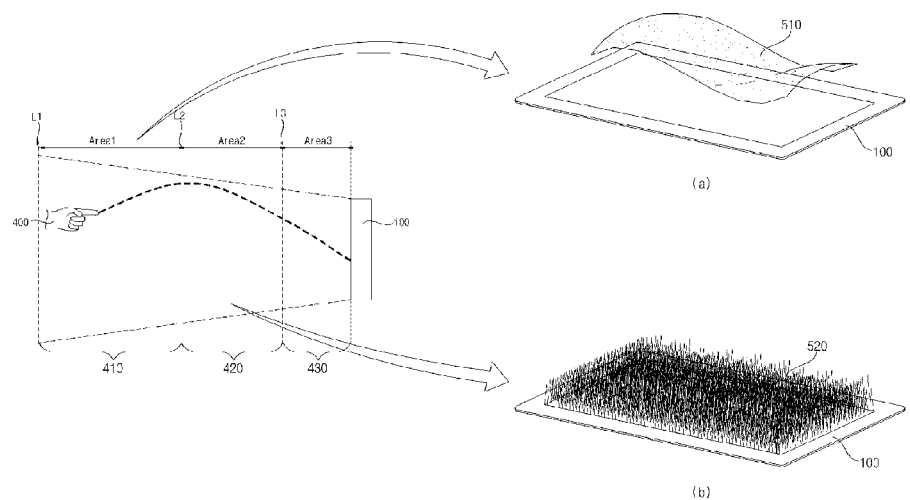
FIG. 5 is a view illustrating an example operation of an optical output unit and a touch sensor unit of FIG. 3.

FIG. 5 illustrates the operation of the optical output units and the touch sensor unit of FIG. 3.

FIG. 5' illustrates a distribution chart of output light 510 in the area 1 and the area 2, as described with reference to FIG. 4b. Particularly, in FIG. 5, the intensity of light at the peripheral area of the display apparatus 100 is higher than the intensity of light at other areas, but the output light 510 is distributed throughout the front surface of the display apparatus 100.

FIG. 5(b) illustrates a distribution chart of electric field 520 in the area 2 and the area 3, as described with reference to FIG. 4b. As described above, as the electrical signal is supplied to the electrode array within the touch sensor unit 126, the electric field 520 is distributed throughout the front surface of the display apparatus 100.

As described above, the display apparatus 100 in accordance with the implementation of the present disclosure may not have a dead zone with respect to user hand recognition in a space on the front surface of the display apparatus 100 as a consequence of combining the optical sensor units 121 and the touch sensor unit 126 detecting floating touch input, based on infrared light. Further, the display apparatus 100 may acquire X-axis, Y-axis, and Z-axis information of the user hand.

Further, the display apparatus 100 may have a high detection speed during detection of the user hand and be increased in size. Further, the display apparatus 100 may selectively operate the touch sensor unit 126 in order to reduce power consumption.

Figure 6A:
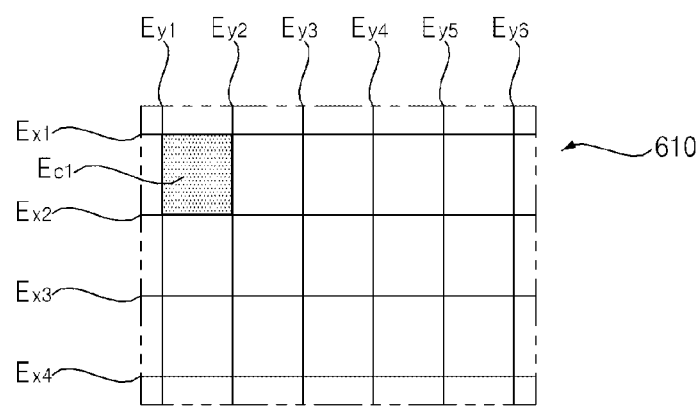
FIGS. 6a to 6c are views illustrating an example operation of the touch sensor unit of FIG. 3.
Figure 6B:
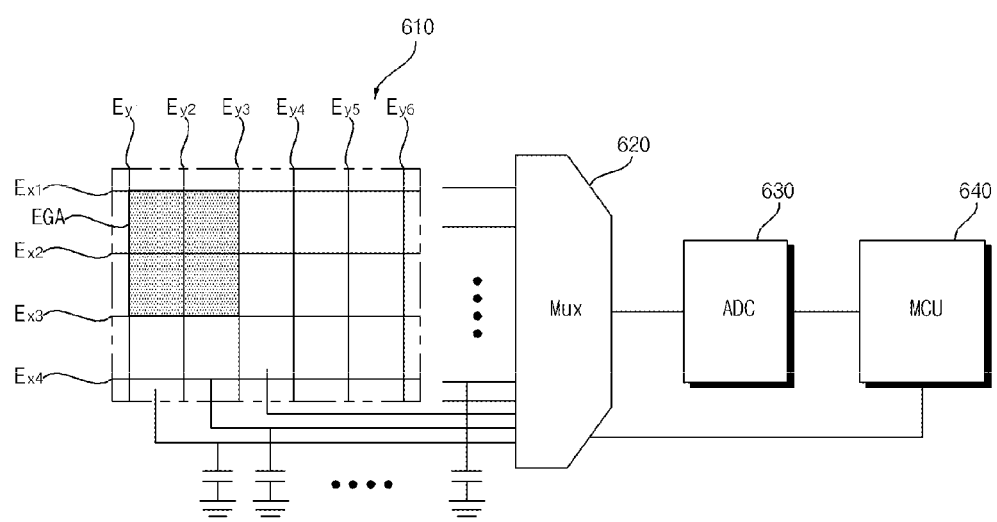
Figure 6C:
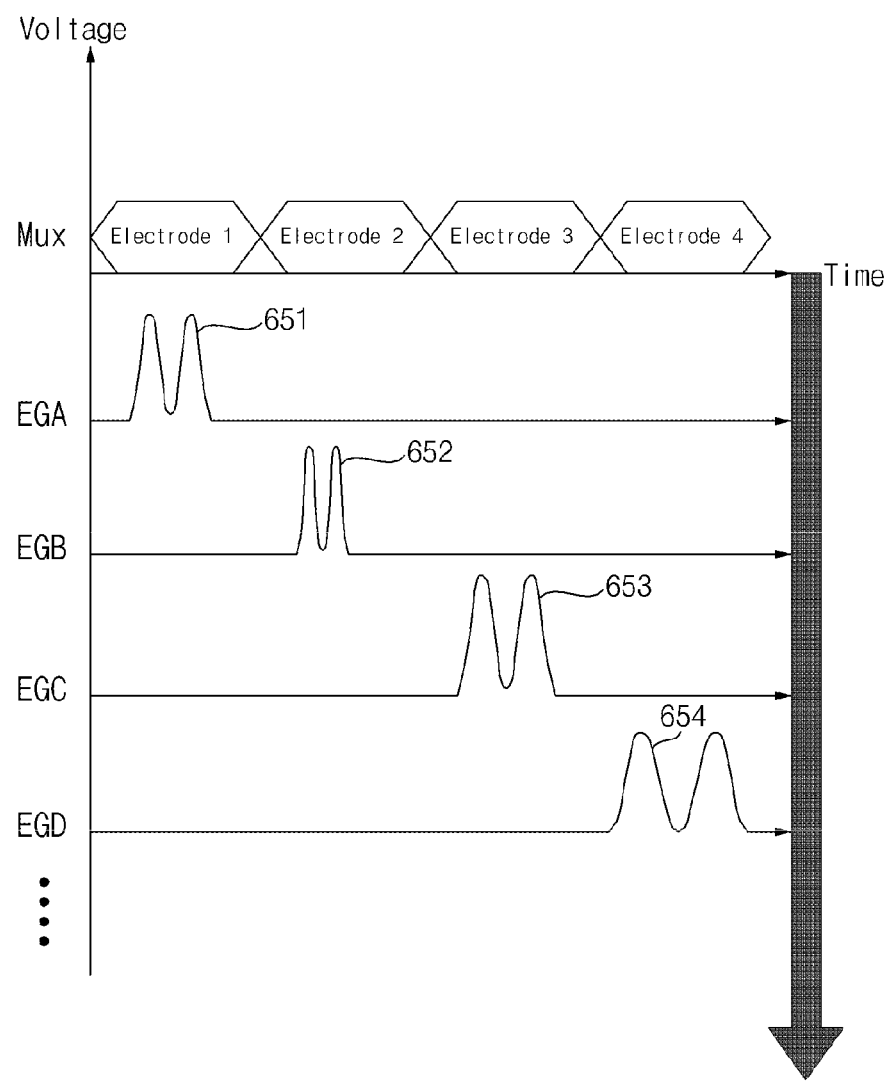

FIGS. 6a to 6c illustrate the operation of the touch sensor unit of FIG. 3.

First, FIG. 6a illustrates a part of an electrode array 610 within the touch sensor unit 126.

The electrode array 610 may include horizontal electrodes $E_{x1}$, $E_{x2}$, $E_{x3}$, and $E_{x4}$, and vertical electrodes $E_{y1}$, $E_{y2}$, $E_{y3}$, $E_{y4}$, $E_{y5}$, and $E_{y6}$.

The processor 170 may change a grouping of the electrode array 610 within the touch sensor unit 126 based on the approximate Z-axis information calculated based on light received by the optical sensor units 121.

As one example, if a user hand is located within the third distance range L3, i.e., located within the above-described area 3, the size of touch sensing cells (grouping electrodes) may be sized to correspond to 1 electrode cell $E_{c1}$, as exemplarily shown in FIG. 6a.

As another example, if a user hand is located between the second distance range L2 and the third distance range L3, i.e., located within the above-described area 2, the size of touch sensing cells (grouping electrodes) may be sized to correspond to 4 electrode cells, i.e., an electrode group A EGA, as exemplarily shown in FIG. 6b.

FIG. 6b illustrates a part of the electrode array 610 within the touch sensor unit 126. Particularly, capacitance change in 4 electrode cells, i.e., the electrode group A EGA, is sensed. Signals of capacitance change in the plural electrode cells are muxed in a Muxer 620, a muxed signal is converted into a digital signal by an ADC 630, and the converted digital signal is processed by an MCU 640.

The MCU 640 may calculate X-axis, Y-axis, and Z-axis information of floating touch input based on the converted digital signal.

If the size of the touch sensing cells (grouping electrodes) is a size corresponding to 4 electrode cells, as exemplarily shown in FIG. 6b, the MCU 640 may apply an electrical signal only to the first and third horizontal electrodes $E_{x1}$ and $E_{x3}$ among the plural horizontal electrodes $E_{x1}$, $E_{x2}$, $E_{x3}$, and $E_{x4}$ and only to the first, third, and fifth vertical electrodes $E_{y1}$, $E_{y3}$ and $E_{y5}$ among the vertical electrodes $E_{y1}$, $E_{y2}$, $E_{y3}$, $E_{y4}$, $E_{y5}$, and $E_{y6}$. Accordingly, the size of the touch sensing cells (grouping electrodes) corresponding to 4 electrode cells may be appropriately set.

The MCU 640 may be included within the above-described processor 170.

The size of the touch sensing cells (grouping electrodes) may be set to various sizes, such as 1×1, 2×2, 3×3, and 2×7, according to the position of a user hand or finger.

Next, FIG. 6c exemplarily illustrates capacitance change sensed by the electrode array 610 within the touch sensor unit 126.

FIG. 6c exemplarily illustrates that the plural electrode groups A, B, C, D, etc. generate capacitance change signals 651, 652, 653, and 654 in a time vision manner. The Muxer 620 may mux these signals 651, 652, 653, and 654 and output the muxed analog signal.

Figure 7:
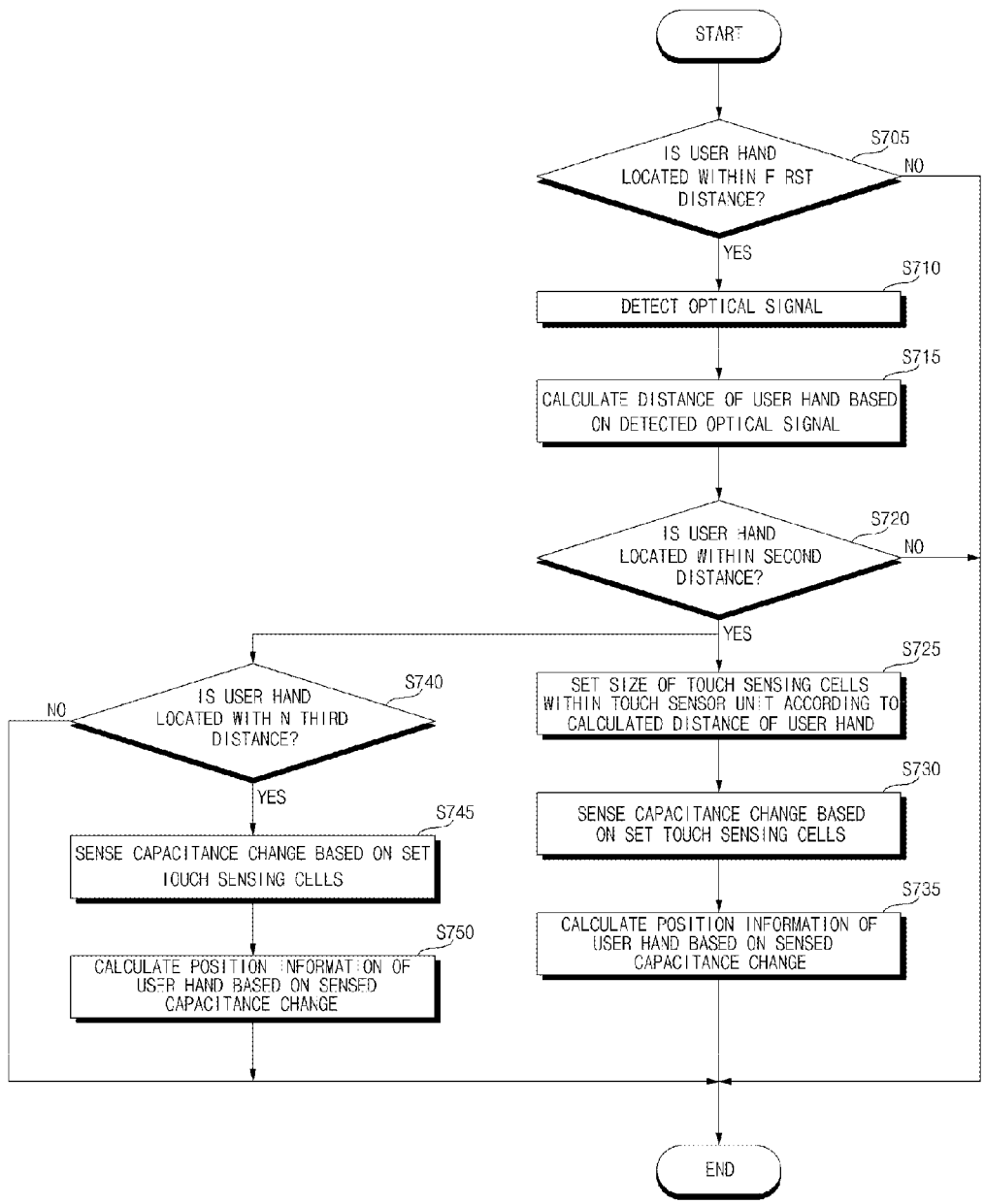
FIG. 7 is a flowchart illustrating an operating method of a display apparatus for vehicles in accordance with one implementation of the present disclosure.

FIG. 7 shows a flowchart illustrating an operating method of a display apparatus for vehicles in accordance with one implementation of the present disclosure.

With reference to FIG. 7, the optical sensor units 121 within the display apparatus 100 output light and receive light corresponding to the output light.

Thereafter, the processor 170 can determine whether or not a user hand is located within the first distance (S705). Upon determining that the user hand is located within the first distance, the intensity of received light is a predetermined value or more and thus, the processor 170 may perform signal processing.

As such, if the received light is recognizable, the processor 170 can cause the optical sensor units 121 to receive light and to detect an optical signal (S710).

The processor 170 of the display apparatus 100 can calculate a distance of the user hand based on the optical signal detected by the optical sensor units 121 (S715).

The processor 170 may calculate position information corresponding to the position of the user hand based on the electrical signal from the optical sensor units 121. In more detail, the processor 170 may calculate X-axis and Y-axis information of the user hand with respect to the display apparatus 100. Further, the processor 170 may approximately calculate a distance between the display apparatus 100 and the user hand, i.e., Z-axis information, based on the strength (or magnitude or amplitude) the electrical signals from the optical sensor unit 121.

Further, the processor 170 of the display apparatus 100 can determine whether the user hand successively approaches the display apparatus 100 and whether the distance of the user hand calculated based on the optical sensor units 121 is within the second distance (S720). Upon determining that the distance of the user hand is within the second distance, the processor 170 operates the touch sensor unit 126 and sets the size of touch sensing cells within the touch sensor unit 126 according to the calculated distance of the user hand (S725).

Here, an area within the second distance may correspond to the above-described area 2. As described above, the area 2 may be an overlap area in which the light output from the optical sensor unit 121 and the electric field generated by the touch sensor unit 126 overlap.

For example, if the distance of the user hand is between the second distance range L2 and the third distance range L3, the size of the touch sensing cells (grouping electrodes) may be a size corresponding to 4 electrode cells by grouping the electrode array.

Thereafter, the touch sensor unit 126 can sense capacitance change caused by the user hand based on the touch sensing cells set to the 4 electrode cells (S730). For example, the touch sensor unit 126 senses capacitance change caused by the user hand in the electric field formed on the front surface of the display apparatus 100.

Thereafter, the processor 170 can calculate position information of the user hand based on the sensed capacitance change (S735). That is, the processor 170 may calculate X-axis and Y-axis information of floating touch input based on the sensed capacitance change. Further, the processor 170 may calculate Z-axis information, i.e., a distance between the display apparatus 100 and the user hand, based on the strength the capacitance change. Here, the X-axis and Y-axis information may be information corresponding to the size of the touch sensing cells corresponding to 4 electrode cells.

Thereafter, upon determining that the distance of the user hand calculated based on the optical signal is within the second distance in operation S720, operation S740 may be carried out.

That is, the processor 170 may determine whether or not the calculated distance of the user hand is within the third distance (S740). Upon determining that the calculated distance of the user hand is within the third distance, the processor 170 can set the touch sensing cells within the touch sensor unit 126 to correspond to 1 electrode cell.

Thereafter, the touch sensor unit 126 senses capacitance change caused by the user hand based on the set touch sensing cells (S745).

Thereafter, the processor 170 can calculate position information of the user hand based on the sensed capacitance change (S750). That is, the processor 170 may calculate X-axis and Y-axis information of floating touch input based on the sensed capacitance change. Further, the processor 170 may approximately calculate Z-axis information, i.e., a distance between the display apparatus 100 and the user hand, based on the strength the capacitance change. Here, the X-axis and Y-axis information may be information corresponding to the size of the touch sensing cells corresponding to 1 electrode cell. Therefore, if the user hand is located within the area 3 rather than the area 2, more accurate position information may be detected.

FIGS. 8 and 9a-9c illustrate the operating method of FIG. 7, exemplarily showing tracking of successive motion of a user hand by the display apparatus.

Figure 8:
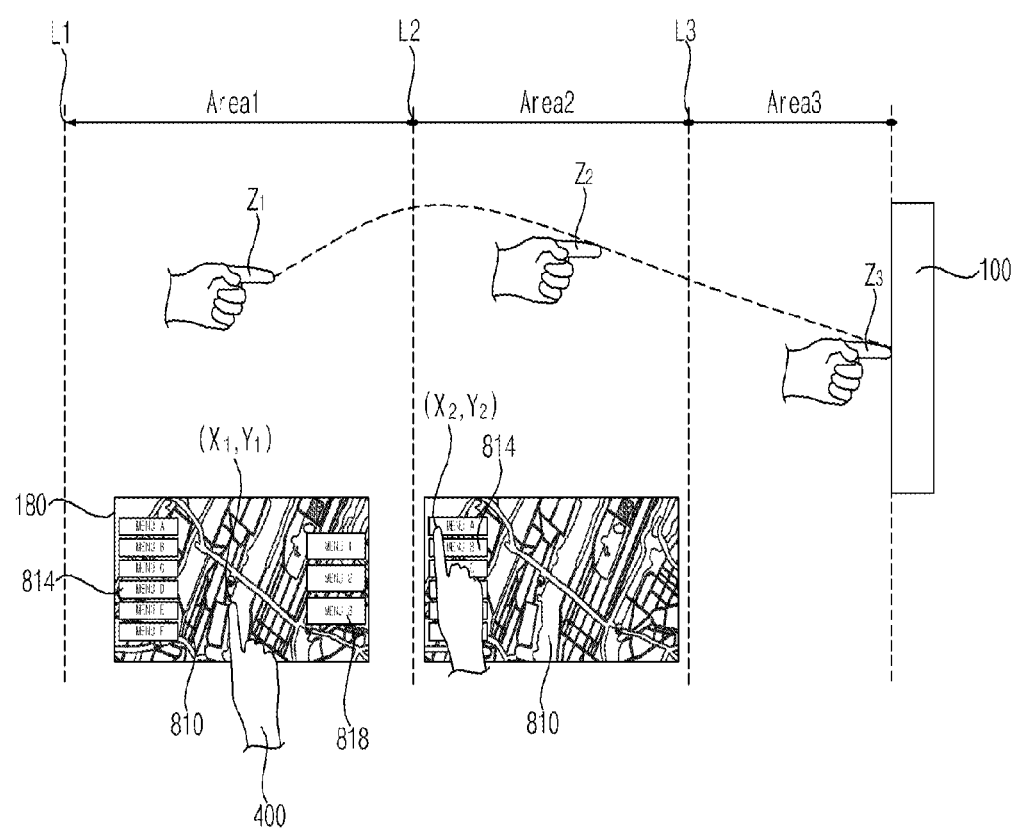

First, with reference to FIG. 8, if the position (x1, y1, z1) of a user hand is located within the area 1, the processor 170 calculates and recognizes distance information z1 of the user hand based on operation of the optical sensor units 121. In addition to Z-axis information z1, the processor 170 may calculate X-axis and Y-axis information x1 and y1.

If the position (x1, y1, z1) of the user hand is located within the area 1 in which light may be recognized, the processor 170 may display a map 810 and first and second menus 814 and 818 on the display unit 180. As such, the map 810 may be automatically displayed according to the position of the user hand without separate input operation, thereby increasing user convenience.

Next, if the user hand gradually approaches the display apparatus 100 and the position (x2, y2, z2) of the user hand is located within the area 2, the processor 170 calculates and recognizes distance information z2 of the user hand based on operation of the optical sensor units 121. In addition to Z-axis information z2, the processor 170 may calculate X-axis and Y-axis information x2 and y2.

If the user hand gradually approaches the display apparatus 100 and the position (x2, y2, z2) of the user hand is located within the area 2, the processor 170 may operate the touch sensor unit 126. Accordingly, the processor 170 may recognize the position information x2, y2, and z2 of the user hand based on capacitance sensed by the touch sensor unit 126.

When the user hand is within the area 2, the processor 170 may acquire more accurate position information through the touch sensor unit 126 than the position information based on the optical sensor units 121.

The size of touch sensing cells in the area 2 may correspond to the size of 4 electrode cells and thus, the X-axis and Y-axis information x2 and y2 may be X-axis and Y-axis information corresponding to the 4 electrode cells.

Further, the processor 170 may display a menu or display only contents relating to the position information of the hand based on the position information of the user hand calculated under the condition that the user hand is located within the area 2.

FIG. 8 illustrates a scenario where the position (x2, y2, z2) of the user hand is located around the first menu 814 and, thus, the non-related second menu 818 is not displayed. As such, a user may focus only a desired menu.

Thereafter, if the user hand more gradually approaches the display apparatus 100 and is located within the area 3 or contacts the display apparatus 100, the processor 170 may recognize floating touch input or direct touch input based on the touch sensor unit 126. That is, the processor 170 may recognize position information x3, y3, and z3 of the user hand. Further, the processor 170 may select a specific item in the first menu 814.

The size of touch sensing cells in the area 3 may correspond to the size of 1 electrode cell, as described above, and thus, the X-axis and Y-axis information x3 and y3 may be X-axis and Y-axis information corresponding to the 1 electrode cell.

Next, FIG. 9a exemplarily illustrates that, if the user hand is located within the area 1, the map 810 is displayed on the display unit 180.

For example, if the distance of the user hand from the display apparatus is Za, the processor 170 calculates and recognizes the distance information Za of the user hand based on operation of the optical sensor units 121. Then, the processor 170 may display the map 810 alone on the display unit 180 based on the calculated distance information.

Next, FIG. 9b exemplarily illustrates that, if the position (xb, yb, zb) of the user hand is located within the area 2, the menu 814 is displayed on the display unit 180 in addition to the map 810. Particularly, FIG. 9b exemplarily illustrates display of the menu 814 corresponding to X-axis and Y-axis coordinates of the user hand.

If the distance information of the user hand calculated based on operation of the optical sensor units 121 is within the second distance range L2, the processor 170 may operate the touch sensor unit 126. As such, the processor 170 may recognize the position information of the user hand based on capacitance sensed by the touch sensor unit 126.

If the user hand further advances to be within the second distance range L2 from the first distance range L1, the processor 170 may output an indicator indicating that touch input is enabled. Here, the indicator may include a predetermined sound output through the audio output unit 185 or a predetermined image output through the display unit 180.

Further, if the user hand is located within the second distance range L2, the processor 170 may display a menu on the display unit 180 based on the position information of the user hand. Particularly, the processor 170 may display a menu in a region corresponding to the position of the user hand based on the X-axis and Y-axis information, i.e., the position information of the user hand. Thereby, the menu may be simply displayed at the position of the user hand during driving and thus, user convenience may be increased.

Next, FIG. 9c exemplarily illustrates that, if the position (xb, yb, zb) of the user hand is located within the area 3 under the condition that the user hand does not contact the display unit 180, a specific item 817 in the menu 814 displayed on the display unit 180 is highlighted. Particularly, FIG. 9c exemplarily illustrates display of the specific item 817 in the menu 814 corresponding to the calculated X-axis and Y-axis coordinates of the user hand. As such, the user may simply select a desired menu item.

In FIG. 9c, the specific item 817 may be directly selected while being highlighted. Further, the specific item 817 may be selected without being highlighted.

By selecting or highlighting a menu displayed on the display or a specific item in the menu according to the distance of the user hand, as described above, the menu or the specific item in the menu in a vehicle in which vibration occurs may be simply selected. Therefore, user convenience may be increased.

The display apparatus for vehicles of the present disclosure is not limited to the configurations and methods of the above-described implementations and all or parts of these implementations may be selectively combined so that various modifications are possible.

The operating method of the display apparatus for vehicles of the present disclosure may be implemented as a code readable by the processor provided in the display apparatus for vehicles in a recording medium readable by the processor. The recording medium readable by the processor may be one of all kinds of recording devices in which data readable by the processor are stored. For example, the recording medium readable by the processor may include a ROM, a RAM, a CD-ROM, a magnetic tape, a floppy disk, an optical data storage medium, or a carrier wave, such as data transmission over the Internet. Further, since the recording medium readable by the processor may be distributed in a computer system connected through a network, a code readable by the processor in a distributed manner may be stored and executed.

As apparent from the above description, a display apparatus for vehicles in accordance with one implementation of the present disclosure includes optical sensor units and a touch sensor unit, calculates the distance of a user hand based on light sensed by the optical sensor units, if the user hand is located within a first distance where received light is recognizable, and operates the touch sensor unit, if the user hand approaches the display within a second distance more proximate to a display than the first distance. Thereby, the display apparatus for vehicles may calculate the position information of the user hand through the touch sensor unit if the user hand is located within the second distance and thus successively track user approach. Thus, user convenience may be improved.

Further, the display apparatus for vehicles selectively operates the touch sensor unit and may thus reduce power consumption.

Further, the display apparatus for vehicles may acquire the position information of the user hand, particularly, X-axis, Y-axis, and Z-axis information, based on capacitance change sensed by the touch sensor unit if the user hand is located within the second distance. Thus, user convenience may be improved.

Further, the display apparatus for vehicles removes a dead zone, when a user hand in a space in front of the display apparatus is recognized, by combination of the optical sensor units based on infrared light and the touch sensor unit to detect floating touch input. Further, the display apparatus for vehicles may have a high detection speed when the user hand is detected and be increased in size.

Further, the display apparatus for vehicles selects or highlights a menu displayed on the display or a specific item in the menu and thus, simplifies selection of the menu or the specific item in the menu in a vehicle in which vibration occurs. Thus, user convenience may be improved.

Although the above implementations of the present disclosure have been disclosed for illustrative purposes, those skilled in the art will appreciate that various modifications, additions and substitutions are possible, without departing from the scope and spirit of the disclosure as disclosed in the accompanying claims.

What is claimed is:

1. A vehicle having a display apparatus, the display apparatus comprising:
a display unit;
an optical sensor unit configured to emit and receive light;
a touch sensor unit disposed on or below a surface of the display unit, the touch sensor unit including a plurality of touch sensing cells; and
a processor configured to (i) determine whether a hand is located within a first distance range away from the display unit, the optical sensor unit being configured to recognize the received light based on the hand being located within the first distance range, and to (ii) determine whether the hand is located within a second distance range away from the display unit that is closer to the display unit than the first distance range, the touch sensor unit being configured to recognize the hand based on the hand being located within the second distance range,
wherein the processor is configured to cause the touch sensor unit to operate based on a determination that the hand has transitioned from being located within the first distance range to being located within the second distance range,
wherein the processor is configured to, based on determining that the hand is located outside the second distance range, not apply power to the touch sensor and to, based on determining that the hand is located within the second distance range, apply power to the touch sensor,
wherein the touch sensor unit further includes three vertical electrodes and three horizontal electrodes that each cross the three vertical electrodes to thereby define four electrode cells,
wherein the processor is configured to, based on determining that the hand is located between the second distance range and a third distance range away from the display unit that is closer to the display unit than the second distance range, set a size of the plurality of touch sensing cells to a first size that corresponds to a size of the four electrode cells by applying a first electrical signal only to two outermost vertical electrodes among the three vertical electrodes and to two outermost horizontal electrodes among the three horizontal electrodes,
wherein the processor is configured to, based on determining that the hand is located within the third distance range, set a size of the plurality of touch sensing cells to a second size that is smaller than the first size and that corresponds to a size of one of the four electrode cells by applying a second electrical signal to the three vertical electrodes and to the three horizontal electrodes, and
wherein the processor is configured to, based on a distance between the hand and the display unit decreasing, increase power provided to one or more of the three vertical and three horizontal electrodes.

2. A display apparatus for a vehicle comprising:
a display unit;
an optical sensor unit configured to emit and receive light;
a touch sensor unit disposed on or below a surface of the display unit, the touch sensor unit including a plurality of touch sensing cells; and
a processor configured to (i) determine whether a hand is located within a first distance range away from the display unit, the optical sensor unit being configured to recognize the received light based on the hand being located within the first distance range, and to (ii) determine whether the hand is located within a second distance range away from the display unit that is closer to the display unit than the first distance range, the touch sensor unit being configured to recognize the hand based on the hand being located within the second distance range,
wherein the processor is configured to cause the touch sensor unit to operate based on a determination that the hand has transitioned from being located within the first distance range to being located within the second distance range,
wherein the processor is configured to, based on determining that the hand is located outside the second distance range, not apply power to the touch sensor and to, based on determining that the hand is located within the second distance range, apply power to the touch sensor,
wherein the touch sensor unit further includes three vertical electrodes and three horizontal electrodes that each cross the three vertical electrodes to thereby define four electrode cells,
wherein the processor is configured to, based on determining that the hand is located between the second distance range and a third distance range away from the display unit that is closer to the display unit than the second distance range, set a size of the plurality of touch sensing cells to a first size that corresponds to a size of the four electrode cells by applying a first electrical signal only to two outermost horizontal electrodes among the three horizontal electrodes and to two outermost vertical electrodes among the three vertical electrodes,
wherein the processor is configured to, based on determining that the hand is located within the third distance range, set a size of the plurality of touch sensing cells to a second size that is smaller than the first size and that corresponds to a size of one of the four electrode cells by applying a second electrical signal to the three horizontal electrodes and to the three vertical electrodes, and
wherein the processor is configured to, based on a distance between the hand and the display unit decreasing, increase power provided to one or more of the three vertical and three horizontal electrodes.

3. The display apparatus of claim 2, wherein the processor is configured to determine that the hand has transitioned from being located within the first distance range to being located within the second distance range based on information received from the optical sensor unit and the touch sensor unit.

4. The display apparatus of claim 2, wherein:
the processor is configured to calculate position information of the hand using the emitted light and the received light based on the hand being located within the first distance range; and
the processor is configured to calculate position information of the hand using capacitance change sensed by the touch sensor unit based on the hand being located within the second distance range and not in contact with the display unit.

5. The display apparatus of claim 2, wherein:
the processor is configured to calculate a position information of the hand using the emitted light and the received light based on the hand being located within the first distance range; and
the processor is configured to calculate a position information of the hand using the emitted light and the received light and further using capacitance change sensed by the touch sensor unit based on the hand being located within the second distance range and not in contact with the display unit.

6. The display apparatus of claim 2, wherein:
the processor is configured to calculate a distance information of the hand using the emitted light and the received light based on the hand being located within the first distance range; and
the processor is configured to calculate a position information of the hand using capacitance change sensed by the touch sensor unit based on the hand being located within the second distance range and not in contact with the display unit, wherein the position information includes x-axis, y-axis, and z-axis information of the hand.

7. The display apparatus of claim 2, wherein the processor is configured to decrease the size of the plurality of touch sensing cells as the calculated distance of the hand decreases and to calculate position information that corresponds to the size of the plurality of touch sensing cells.

8. The display apparatus of claim 2, wherein the processor is configured to change the size of the plurality of touch sensing cells by causing an electrical signal applied to an electrode array within the touch sensor unit to change.

9. The display apparatus of claim 2, wherein the plurality of touch sensing cells are configured to emit capacitance change signals corresponding to the hand based on the hand being located within the second distance range, and wherein the processor is configured to, based on determining that the hand is located within the second distance range and that at least some of the plurality of touch sensing cells have emitted the capacitance change signals, calculate position information of the hand based on a capacitance change signal that has a highest intensity among the emitted capacitance change signals.

10. The display apparatus of claim 2, wherein:
the optical sensor unit is disposed on a peripheral area of the display unit; and
the processor is configured to, based on determining that the hand is located within the first distance range in a region corresponding to the peripheral area of the display unit, calculate position information of the hand based on the emitted light and the received light.

11. The display apparatus of claim 2, wherein the optical sensor unit includes one or more optical output units configured to emit light and one or more optical reception units configured to receive light, the one or more optical output units and the one or more optical reception units being separate from each other.

12. The display apparatus of claim 11, wherein a peripheral area of the display unit includes a bezel frame and a plurality of noise control frame units disposed on the bezel frame, and wherein each of the optical output units and the optical reception units are disposed between adjacent of the plurality of noise control frame units.

13. The display apparatus of claim 12, further comprising an overlay disposed over the noise control frame units, wherein the optical sensor unit is configured such that an air gap formed between the overlay and the optical reception units is larger than an air gap formed between the overlay and the optical output units.

14. The display apparatus of claim 2, wherein the processor is configured to calculate position information of the hand and to control the display unit to display a menu item at an area of the display unit that corresponds to the calculated position information of the hand.

15. The display apparatus of claim 2, wherein the processor is configured to, based on determining that the hand has transitioned from being located within the first distance range to being located within the second distance range, output an indicator configured to indicate that touch input via the touch sensor unit is enabled.

16. The display apparatus of claim 15, wherein the indicator includes a predetermined sound output for causing a corresponding sound to be played or a predetermined image output for causing a corresponding image to be displayed.

17. The display apparatus of claim 16, wherein the processor is configured to, based on determining that the hand is not in contact with the display unit and further located within a third distance range, highlight a specific item to be selected in a menu displayed on the display unit that corresponds to calculated position information of the hand.

18. The display apparatus of claim 17, wherein the processor is configured to determine that the highlighted item has been selected based on the hand making contact with an area of the display unit corresponding to the highlighted item.

* * * * *